United States Patent
Jooste

(10) Patent No.: US 9,026,613 B2
(45) Date of Patent: May 5, 2015

(54) PERMANENT CONNECTION ORIENTED COMMUNICATION USING PARALLEL SINGLE CONNECTION CIRCUITS

(75) Inventor: Sarel Kobus Jooste, Novato, CA (US)

(73) Assignee: VMware, Inc., Palo Alto, CA (US)

( * ) Notice: Subject to any disclaimer, the term of this patent is extended or adjusted under 35 U.S.C. 154(b) by 169 days.

(21) Appl. No.: 13/449,141

(22) Filed: Apr. 17, 2012

(65) Prior Publication Data

US 2013/0054741 A1    Feb. 28, 2013

Related U.S. Application Data

(60) Provisional application No. 61/528,634, filed on Aug. 29, 2011.

(51) Int. Cl.
G06F 15/16   (2006.01)
H04L 29/08   (2006.01)

(52) U.S. Cl.
CPC .............. *H04L 67/02* (2013.01); *H04L 67/142* (2013.01)

(58) Field of Classification Search
CPC .............................. H04L 67/02; H04L 67/142
USPC .......................................... 709/203, 217, 219
See application file for complete search history.

(56) References Cited

U.S. PATENT DOCUMENTS

| | | | |
|---|---|---|---|
| 6,789,119 B1 * | 9/2004 | Zhu et al. | 709/227 |
| 7,577,749 B1 * | 8/2009 | Long | 709/230 |
| 7,831,737 B2 * | 11/2010 | Matsushima | 709/250 |
| 2003/0023743 A1 * | 1/2003 | Raphel et al. | 709/232 |
| 2003/0040937 A1 * | 2/2003 | Gregersen et al. | 705/1 |
| 2008/0313545 A1 | 12/2008 | Patel et al. | |
| 2010/0057918 A1 * | 3/2010 | Riemers | 709/227 |
| 2011/0066718 A1 * | 3/2011 | Susai et al. | 709/224 |
| 2011/0258432 A1 * | 10/2011 | Rao et al. | 713/150 |
| 2011/0280247 A1 * | 11/2011 | Roskind | 370/401 |
| 2011/0296038 A1 * | 12/2011 | Mandre | 709/228 |
| 2012/0144388 A1 * | 6/2012 | Kurian et al. | 718/1 |

* cited by examiner

*Primary Examiner* — Brian J Gillis
*Assistant Examiner* — Steve Lin

(57) ABSTRACT

Methods, systems, and techniques for providing a pseudo permanent communications connection using temporary connection protocols are described. Example embodiments provide a Enhanced Communications Layer that provides such connections by means of a layer incorporated in the client side and server side communications stacks. The ECL maintains a pool of connections that are opened and used in a staggered fashion to reduce the amount of connection setup and teardown.

20 Claims, 8 Drawing Sheets

PERMANENT CONNECTION ORIENTED COMMUNICATION USING PARALLEL SINGLE CONNECTION CIRCUITS

CROSS-NOTING TO RELATED APPLICATIONS

This Application claims the benefit of U.S. Provisional Application No. 61/528,634, entitled "PERMANENT CONNECTION ORIENTED COMMUNICATION USING PARALLEL SINGLE CONNECTION CIRCUITS," filed on Aug. 29, 2011, which is incorporated herein by reference in its entirety.

TECHNICAL FIELD

The present disclosure relates to methods, techniques, and systems for providing pseudo permanent connections using communications circuits that do not survive beyond a single exchange and, in particular, to methods, techniques, and systems for providing pseudo permanent connections that are maintained across data exchanges using a connection protocol such as HTTP.

BACKGROUND

HTTP is a type of "single connection per single payload" protocol. That is, whenever data is transferred in the payload of a packet, and thereafter received, the connection is shut down. By design of the HTTP protocol, a connection is setup and made, a request (e.g., an HTTP request) is transmitted from a client device (client) to a server computing system (server), a response (e.g., an HTTP response) from server is received at the client, and the connection is closed. The request may be to request data from the server (e.g., an HTTP "GET"), for example, an html page at a designated uniform resource identifier (uri or url); or the request may be to transmit (send, forward, communicate, etc.) data to the server (e.g., an HTTP "POST"). The response from the server is typically to send the html page located at the uri specified with the response or to receive the data sent by the client. The payload of an HTTP packet contains the data (e.g., the uri, posted data, or html page).

There are a couple of exceptions to this. In one extension to HTTP, a multi-part response to an HTTP request allows more than one response to be received for a single connection. However, the connection is still is effectively one HTTP request per connection, because a client cannot interpret and re-send data, based on the response(s), without making another connection to the server. In addition, some browsers, such as Internet Explorer, which support multiple payloads, include a size limitation on certain elements of the multi-part message.

Comet style programming, which provides a web application model, improves or eliminates connection setup time by making the connection ahead of time, and keeping the connection open, in anticipation that data that will be sent to a browser. This model anticipates that a server will push data to a browser, without the browser (or other application executing on the client) explicitly requesting it using an HTTP request. It is a type of "push" protocol. But even these connections eventually have to be closed.

See, for example, http://en.wikipedia.org/wiki/Comet_(programming).

Use of HTTP connections is not efficient due to the overhead on both the client and the server in setting up and closing out the connections. Use of such connections also introduces latency in communication between the client and server, because each connection has to be established before a request can be made. Also, there is no provision for providing state information across connections, as each connection is independent of another. Hence, there is no support for persistency or state-full information across connections, unless duplicate state information is passed in a subsequent request, or state identifiers are used.

Other single payload per single connection type protocols have similar deficiencies.

DETAILED DESCRIPTION

Embodiments described herein provide enhanced computer- and network-based methods, systems, and techniques for providing pseudo permanent connection oriented communication using communication circuits that do not survive beyond a single exchange of data between a client device or client computing system (client) and a server computing system (server). Example embodiments provide an enhanced communications layer ("ECL"), which provides client-server communication that emulates pseudo permanent connections in a single payload connection protocol environment such as that available with a connection protocol such as HTTP. The ECL offers pseudo permanent connections by maintaining a pool of open connections which the enhanced communication layer uses in a staggered fashion to service client requests in a manner that reduces the latency caused by connection setup and teardown. Different embodiments may implement the pool of connections utilizing any number of actual connections, even though examples are shown herein with a small number of connections (e.g., three connections). A client portion ECL is integrated into the communications stack of the client logic of a client system such that the communication protocol requests are routed automatically through the ECL instead of directly to the server logic. Similarly, a server portion of the ECL is integrated into the communications stack of server logic of a server system such that it receives the communication protocol requests from the client over one of the indicated pool of connections in a fashion that allows the server to respond as if the requests were maintained over a single permanently open connection.

Figure 1:
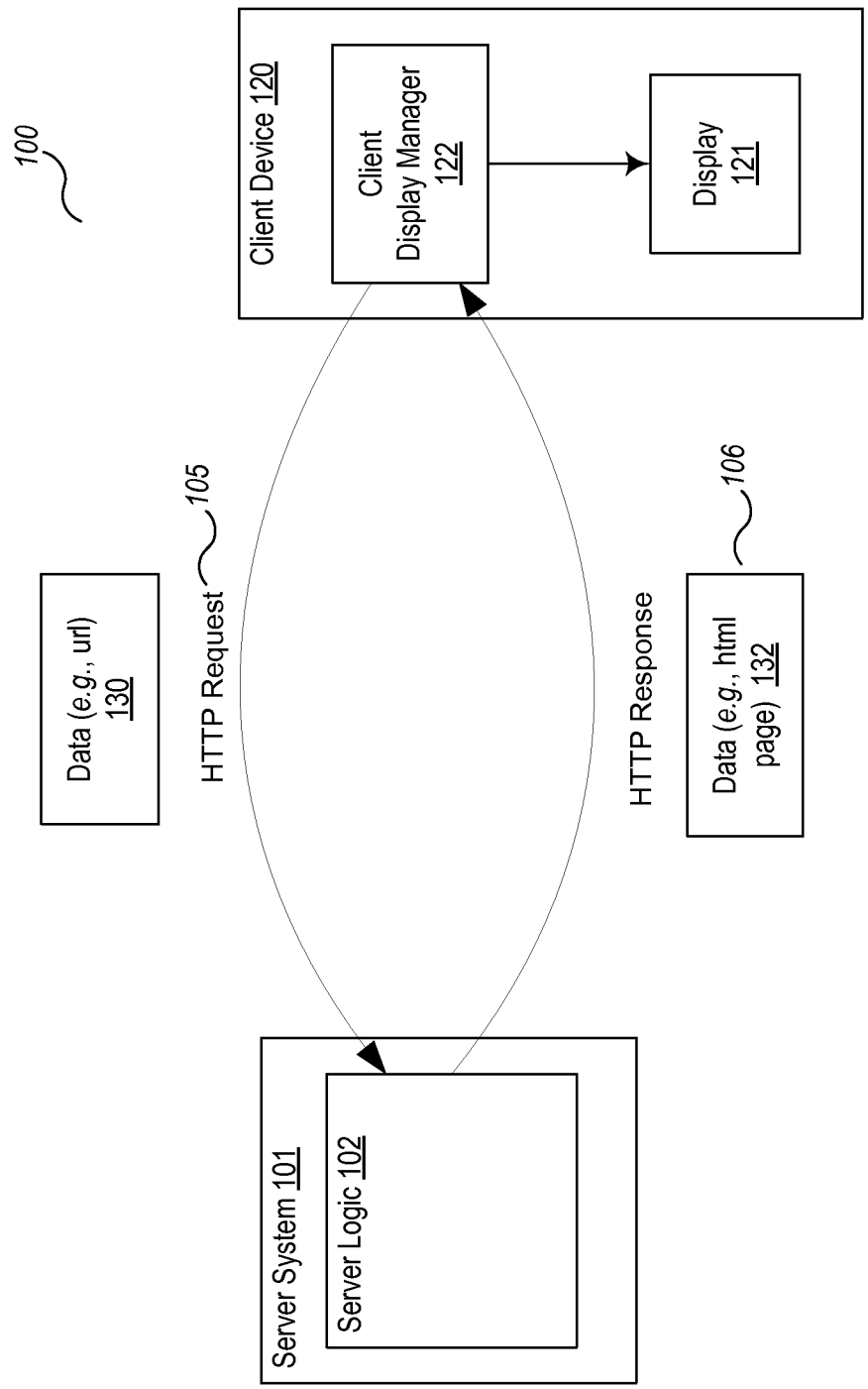
FIG. 1 is a block diagram of an example request response single connection exchange between an example client and an example server.

FIG. 1 is a block diagram of an example request response single connection exchange between an example client and an example server. Such an exchange is available from single connection per single payload type of protocols like HTTP. As illustrated in FIG. 1, client device 120 communicates with server computing system 101 via request 105 and response 106 via a single, temporary connection. The client display manager 122, such as a browser application running on the client device 120 initiates the communication by sending an HTTP request 105 message (typically over a TCP/IP connection) to server logic 102. The server logic 102 responds to the message by determining the correct data to send and sending it back to the client via an HTTP response 106. For example, in response to a request for data 130, e.g., a specific uniform resource identifier (uri/url), the server responds with data 132—a requested html page. When the html page is communicated to the client display manager 122, the connection is closed, and the display manager 122 renders the received page 132 on a display 121 associated with the client device 120.

Figure 2:
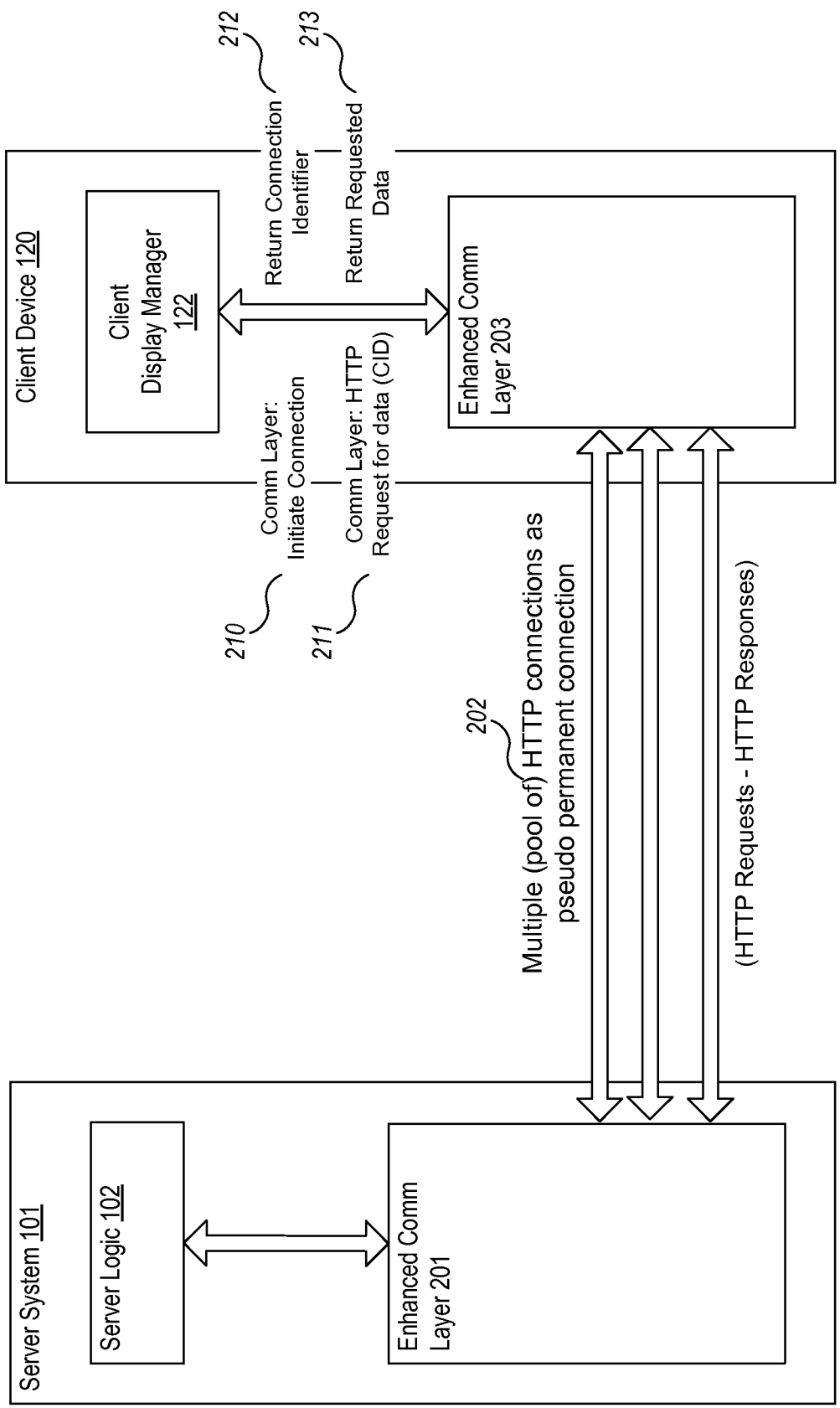
FIG. 2 is an example block diagram of an example client side and server side Enhanced Communication Layer operating in an example environment.

FIG. 2 is an example block diagram of an example client side and server side Enhanced Communication Layer operating in an example environment. In FIG. 2, the server computing system 101 contains server logic 102 for responding to requests from clients and the Enhanced Communication Layer 201 for providing the pseudo permanent connections described herein. When used with the HTTP protocol, the ECL 201 can be integrated into the server, for example, as a plugin or loadable module in an existing HTTP server implementation, such as Apache or Microsoft IIS, or may be implemented as an entire HTTP server stack. The ECL 201 responds to client requests for data using the pool of single circuit connections 202. For example, when used with HTTP, the connection pool 202 represents distinct HTTP connections which may be used sequentially by the ECL to respond to HTTP requests. In some embodiments that support multiple parallel connections (more than one connection to a client at any one time), the parallel connections may be used in a rotating fashion to communicate with connected client devices.

The client device 120 includes a client display manager 122, such as a browser or other application connected to a network that includes server 101. The client 120 also includes a client side Enhanced Communication Layer 203 for providing the client side of the pseudo permanent connections described herein including opening connections to the server 101 to send and receive data. In a typical embodiment, the ECL 203 is integrated into the client 120, for example, through a browser plugin or by using a scripting language or compiled language to incorporate the ECL 203 into the HTTP client side stack.

When a client requests data, it first uses the ECL 203 to initiate a connection (event 210). In response the ECL 203 returns a connection identifier (event 212) that is used to identify the pseudo permanent connection. Next, an HTTP request is sent (event 211) which is intercepted by the client side ECL 203 in order to communicate with the server side ECL 201 to use one or more connections from connection pool 202 to send a request for data to the server 101. After the ECL 203 receives data from the server 101, the data is returned to the client display manager 122 (event 213).

The setup of the connections in the connection pool 202 is described further below with respect to FIGS. 3, 6A, 6B, and 7. In summary, "spare" connections are established so that the client 120 does not require connection setup or take down time and can view and use the multiple connections as if they were a single pseudo permanent connection. The client display manager 122 does not need to know that multiple data connections are being established to provide the single pseudo permanent connection—connection setup and management is performed transparently by the ECL 201 and 203. Also, although use of the ECL 201 and ECL 203 has been described in FIG. 2 with reference to the HTTP protocol as an example, the ECL may be used with and incorporated into any other protocol that provides single connection per payload type of connections or even with other multiple connection type protocols.

Figure 3:
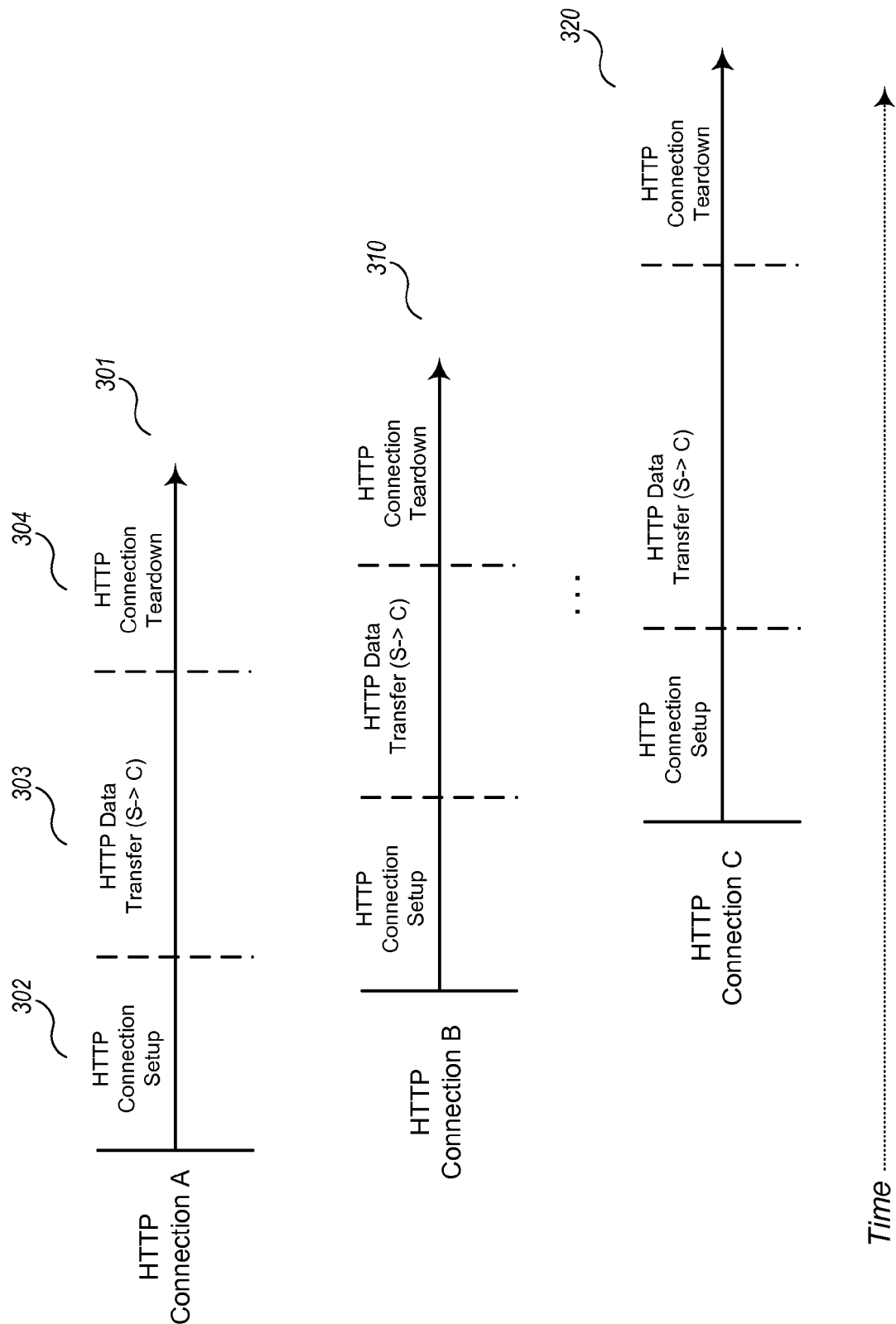
FIG. 3 is an example block diagram of a pool of single connection circuits used to implement a pseudo permanent connection according to example embodiments.

FIG. 3 is an example block diagram of a pool of single connection circuits used to implement a pseudo permanent connection according to example embodiments of the ECL. As an example, FIG. 3 illustrates a pool of three connections, connection A 301, connection B 310, and connection C 320. These connections are shown temporally. For example, each connection is shown with a setup time, e.g., setup 302, a data transfer time, e.g., data transfer 303, and a connection teardown time, e.g., teardown time 304. In order to effectuate a pseudo permanent connection, a second connection (connection B 310) is established during the time that the first connection (connection A 301) is still being used, so that a next client data request can be immediately shifted to it, as soon as the first request finishes being handled. Similarly, a third connection (connection C 320) is established during the time that the second connection (connection B 310) is still being used, so that another next client data request can be immediately shifted to it, as soon as the second request finishes being handled. This allows each client request to be handled sequentially and in order. In at least one embodiment, each request is guaranteed to complete before another is begun—as though they were being sent over a single permanent, ordered connection.

Also, different embodiments may implement the pool of single connection circuits used to implement the pseudo permanent connection utilizing any number of connection circuits, even though examples are shown herein with a small number of connections. For example, in some embodiments, 4 or 6 circuits may be used—or even 100.

In one example embodiment, each subsequent connection (e.g., connection B 310) is started before the data transfer period of the prior connection (e.g., connection A 301). In other embodiments, each subsequent connection is started at other times that overlap the period of existence of another connection, such as during setup, during data transfer, during teardown, etc.

Although the techniques of the ECL are generally applicable to any type of request response protocol that employs a single payload connection, these techniques may be incorporated in other systems as well, including those that already have the ability to create permanent or semi-permanent connections. Also, although certain terms are used primarily herein, other terms could be used interchangeably to yield equivalent embodiments and examples. In addition, terms may have alternate spellings which may or may not be explicitly mentioned, and all such variations of terms are intended to be included.

Example embodiments described herein provide applications, tools, data structures and other support to implement pseudo permanent data connections. In the following description, numerous specific details are set forth, such as data formats and code sequences, etc., in order to provide a thorough understanding of the described techniques. The embodiments described also can be practiced without some of the specific details described herein, or with other specific details, such as changes with respect to the ordering of the code flow, different code flows, etc. Thus, the scope of the techniques and/or functions described are not limited by the particular order, selection, or decomposition of steps described with reference to any particular routine.

Figure 4:
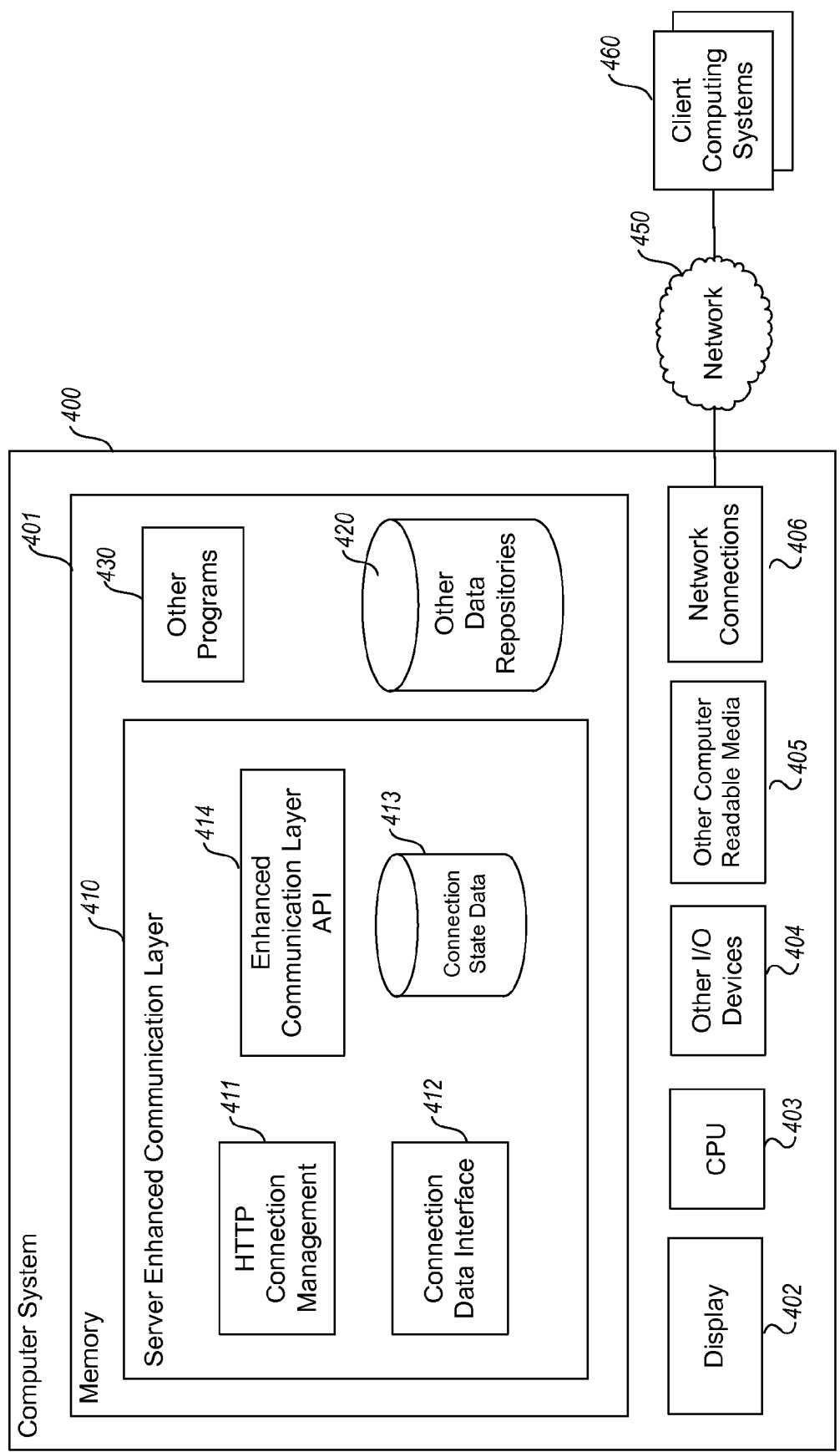
FIG. 4 is an example block diagram of a server computing system for practicing example embodiments of an Enhanced Communication Layer.

FIG. 4 is an example block diagram of a server computing system for practicing example embodiments of an Enhanced Communication Layer as described herein. Note that a general purpose or a special purpose computing system suitably instructed as described herein may be used to implement an Enhanced Communication Layer that provides pseudo permanent communication connections. Further, the ECL may be implemented in software, hardware, firmware, or in some combination to achieve the capabilities described herein.

The computing system 400 may comprise one or more server and/or client computing systems and may span distributed locations. In addition, each block shown may represent one or more such blocks as appropriate to a specific embodiment or may be combined with other blocks. Moreover, the various blocks of the ECL 410 may physically reside on one or more machines, which use standard (e.g., TCP/IP) or proprietary interprocess communication mechanisms to communicate with each other.

In the embodiment shown, computer system 400 comprises a computer memory ("memory") 401, a display 402, one or more Central Processing Units ("CPU") 403, Input/Output devices 404 (e.g., keyboard, mouse, CRT or LCD display, etc.), other computer-readable media 405, and one or more network connections 406. The ECL 410 is shown residing in memory 401. In other embodiments, some portion of the contents, some of, or all of the components of the ECL 410 may be stored on and/or transmitted over the other computer-readable media 405. The components of the ECL 410 preferably execute on one or more CPUs 403 and manage the generation and use of a connection pool, as described herein. Other code or programs 430 and potentially other data repositories, such as data repository 420, also reside in the memory 401, and preferably execute on one or more CPUs 403. Of note, one or more of the components in FIG. 4 may not be present in any specific implementation. For example, some embodiments embedded in other software may not provide means for user input or display.

In a typical embodiment, the ECL 410 includes an Connection Management component 411 (here shown as HTTP Connection Management 410), a connection data interface 412 for implementing connection logic, in this example, an HTTP stack, and a connection state data repository 413. In addition, an application programming interface ("API") 414 to the ECL may be provided. Each of these components operate as described elsewhere herein and cooperate to provide a pseudo permanent communications connection by intercepting data requests and controlling responses thereto.

In at least some embodiments, some of the connection management 411 may be provided external to the ECL 410 and available, potentially, over one or more networks 450. Other and/or different modules may be implemented. In addition, the ECL may interact via a network 450 with one or more client computing systems 460. Also, of note, the connection state data repository 413 may be provided external to the ECL 410 as well, for example in a knowledge base accessible over one or more networks 450.

Figure 5:
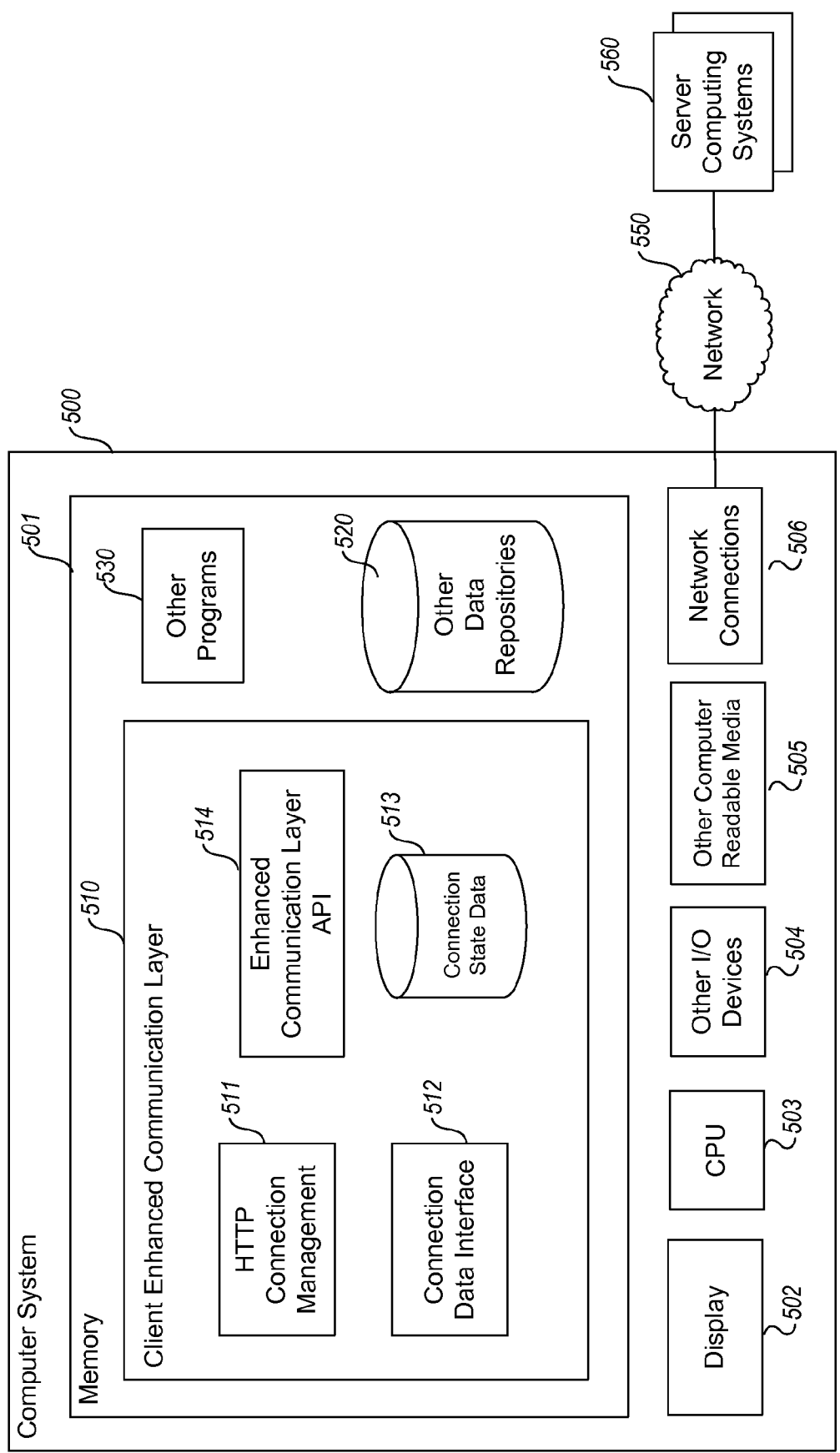
FIG. 5 is an example block diagram of a client computing system for practicing example embodiments of an Enhanced Communication Layer.

FIG. 5 is an example block diagram of a server computing system for practicing example embodiments of an Enhanced Communication Layer as described herein. Note that a general purpose or a special purpose computing system suitably instructed as described herein may be used to implement an Enhanced Communication Layer that provides pseudo permanent communication connections. Further, the ECL may be implemented in software, hardware, firmware, or in some combination to achieve the capabilities described herein.

The computing system 500 may comprise one or more server and/or client computing systems and may span distributed locations. In addition, each block shown may represent one or more such blocks as appropriate to a specific embodiment or may be combined with other blocks. Moreover, the various blocks of the ECL 510 may physically reside on one or more machines, which use standard (e.g., TCP/IP) or proprietary interprocess communication mechanisms to communicate with each other.

In the embodiment shown, computer system 500 comprises a computer memory ("memory") 501, a display 502, one or more Central Processing Units ("CPU") 503, Input/Output devices 504 (e.g., keyboard, mouse, CRT or LCD display, etc.), other computer-readable media 505, and one or more network connections 506. The ECL 510 is shown residing in memory 501. In other embodiments, some portion of the contents, some of, or all of the components of the ECL 510 may be stored on and/or transmitted over the other computer-readable media 505. The components of the ECL 510 preferably execute on one or more CPUs 503 and manage the generation and use of a connection pool, as described herein. Other code or programs 530 and potentially other data repositories, such as data repository 520, also reside in the memory 501, and preferably execute on one or more CPUs 503. Of note, one or more of the components in FIG. 5 may not be present in any specific implementation. For example, some embodiments embedded in other software may not provide means for user input or display.

In a typical embodiment, the ECL 510 includes an Connection Management component 511 (here shown as HTTP Connection Management 510), a connection data interface 512 for implementing connection logic, in this example, an HTTP stack, and a connection state data repository 513. In addition, an application programming interface ("API") 514 to the ECL may be provided. Each of these components operate as described elsewhere herein and cooperate to provide a pseudo permanent communications connection by intercepting data requests and controlling responses thereto.

In at least some embodiments, some of the connection management 511 may be provided external to the ECL 510 and available, potentially, over one or more networks 550. Other and/or different modules may be implemented. In addition, the ECL may interact via a network 550 with one or more server computing systems 560. Also, of note, the connection state data repository 513 may be provided external to the ECL 510 as well, for example in a knowledge base accessible over one or more networks 550.

In an example embodiment, components/modules of the ECL as shown in FIGS. 4 and 5 are implemented using standard programming techniques. However, a range of programming languages known in the art may be employed for implementing such example embodiments, including representative implementations of various programming language paradigms, including but not limited to, object-oriented (e.g., Java, C++, C#, Smalltalk, etc.), functional (e.g., ML, Lisp, Scheme, etc.), procedural (e.g., C, Pascal, Ada, Modula, etc.), scripting (e.g., Perl, Ruby, Python, JavaScript, VBScript, etc.), declarative (e.g., SQL, Prolog, etc.), etc.

The embodiments described above may also use well-known or proprietary synchronous or asynchronous client-server computing techniques. However, the various components may be implemented using more monolithic programming techniques as well, for example, as an executable running on a single CPU computer system, or alternately decomposed using a variety of structuring techniques known in the art, including but not limited to, multiprogramming, multithreading, client-server, or peer-to-peer, running on one or more computer systems each having one or more CPUs. Some embodiments are illustrated as executing concurrently and asynchronously and communicating using message passing techniques. Equivalent synchronous embodiments are also supported by an <system initials> implementation.

In addition, programming interfaces to the data stored as part of the ECL can be available by standard means such as through C, C++, C#, and Java APIs; libraries for accessing files, databases, or other data repositories; through scripting languages such as XML; or through Web servers, FTP servers, or other types of servers providing access to stored data. The data repositories (such as repositories 413 and/or 513) may be implemented as one or more database systems, file systems, or any other method known in the art for storing such information, or any combination of the above, including implementation using distributed computing techniques.

Also the example ECL may be implemented in a distributed environment comprising multiple, even heterogeneous, computer systems and networks. In additional the server and/or client may be physical or virtual computing systems and may reside on the same physical system. Also, one or more of the modules may themselves be distributed, pooled or otherwise grouped, such as for load balancing, reliability or security reasons. Different configurations and locations of programs and data are contemplated for use with techniques of described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, etc.) etc. Other variations are possible. Also, other functionality could be provided by each component/module, or existing functionality could be distributed amongst the components/modules in different ways, yet still achieve the functions described herein.

Furthermore, in some embodiments, some or all of the components of the ECL may be implemented or provided in other manners, such as at least partially in firmware and/or hardware, including, but not limited to one ore more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the system components and/or data structures may also be stored (e.g., as executable or other machine readable software instructions or structured data) on a computer-readable medium (e.g., a hard disk; a memory; a network; or a portable media article to be read by an appropriate drive or via an appropriate connection). Some or all of the components and/or data structures may be stored on tangible storage mediums. Some or all of the system components and data structures may also be transmitted in a non-transitory manner via generated data signals (e.g., as part of a carrier wave or other analog or digital propagated signal) on a variety of computer-readable transmission mediums, such as media Y05, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

As described in FIGS. 1-3, one of the functions of an ECL is to manage temporary data connections in a manner that can be used to emulate a pseudo permanent data communications connection.

Figure 6A:
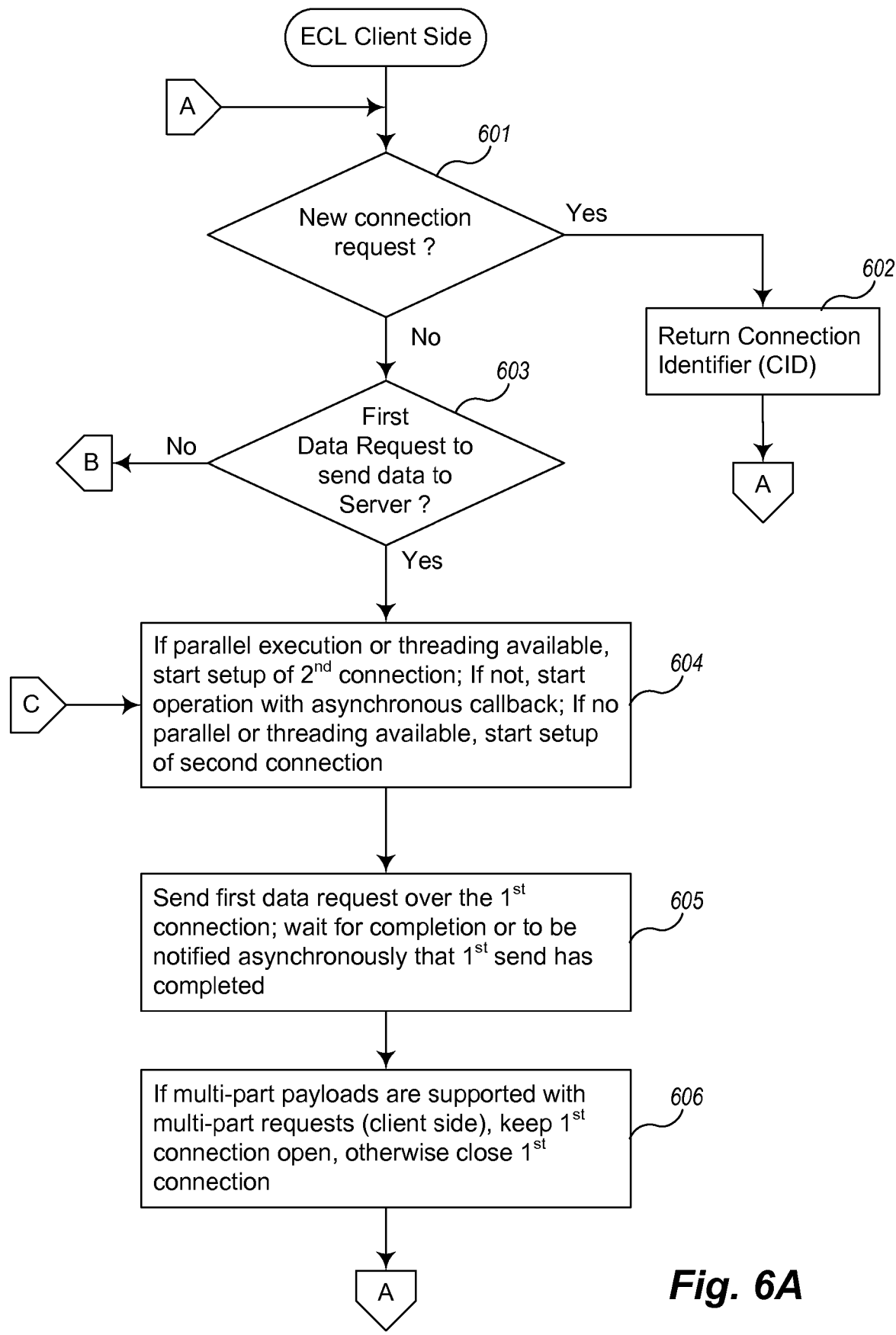
FIGS. 6A and 6B are example flow diagrams of client side Enhanced Communication Layer logic according to example embodiments.
Figure 6B:
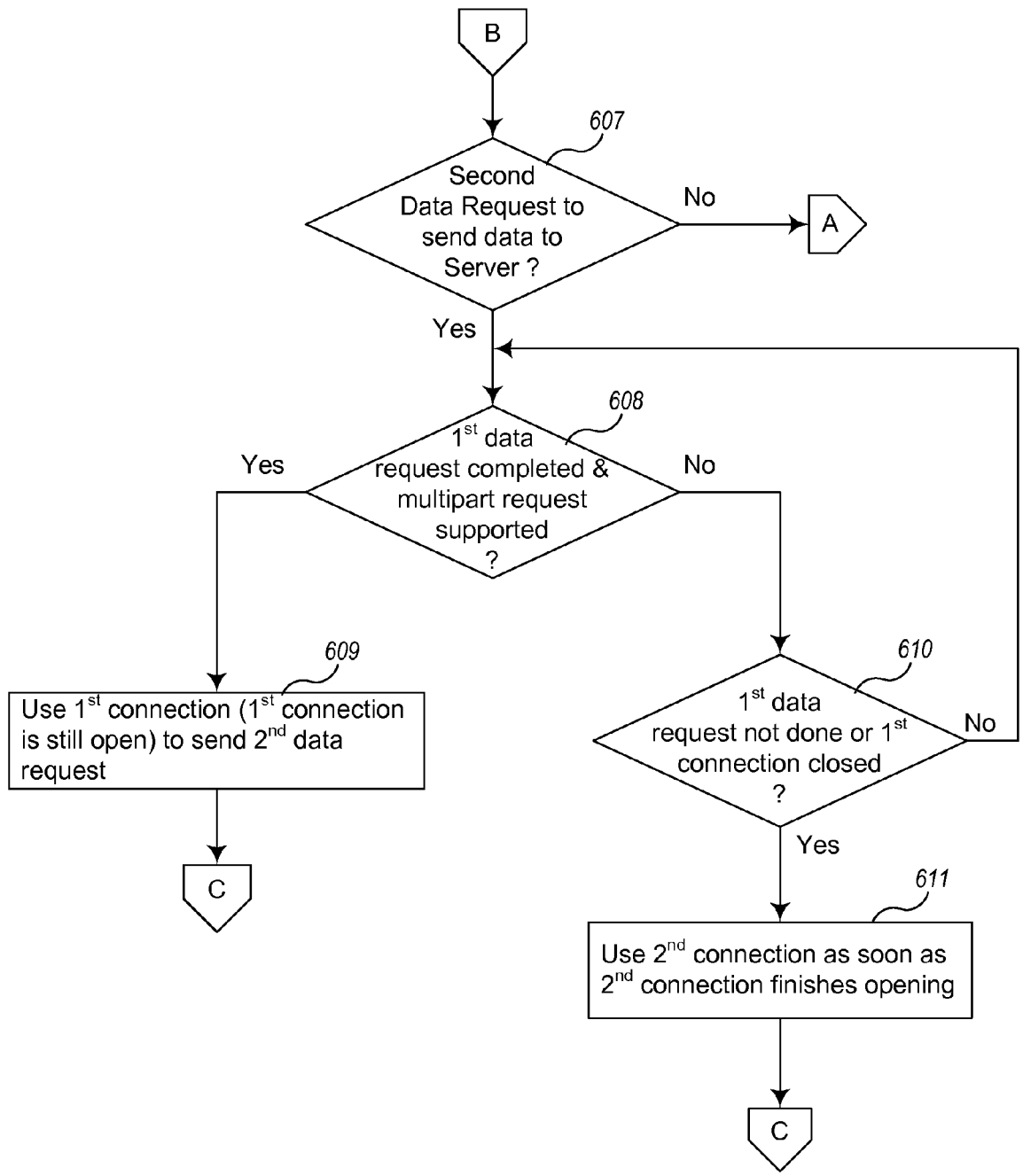

FIGS. 6A and 6B are example flow diagrams of client side Enhanced Communication Layer logic according to example embodiments. The client side ECL logic provides an event loop 601-611 that processes communication connection requests for data. Although only shown processing two data requests, the same logic can be used for subsequent requests. In addition, any number of overlapping connections (such as those illustrated in FIG. 3) may be used to provide a pseudo permanent connection, even though the Figure illustrates the use of two. For example, other systems may support 4, 6, or an even greater number of overlapping (simultaneous) connections. The client side ECL logic may be provided, for example, by ECL 203 in FIG. 2.

More specifically, in block 601, the logic determines whether the client application (e.g., web browser or other application invoking the communications protocol) has requested a new connection. If so, the logic returns a new connection identifier in block 602 and then returns to block 601 to wait for the next event. Otherwise, the logic continues in block 603.

In block 603, the logic determines whether this is a first request on the pseudo permanent connection to send data to the server. If so, the logic continues at block 604, otherwise continues at block 607 to see if it is another type of event.

In block 604, the logic determines whether parallel execution or threading are available, and, if so, starts setup of a second connection (because two connections can be used simultaneously). If not (no parallel execution or threading), the logic determines whether it can perform and initiates an asynchronous callback such that it can be notified of completion of use of a connection instead of having to "block" (wait) until the connection use finishes. It then initiates setup of a second connection, and continues to block 605.

In block 605, the logic sends the first data request over the first connection and either waits (blocks) for its completion or to be notified asynchronously (via the callback) that the first data request is complete. The logic then continues to block 606.

Figure 7:
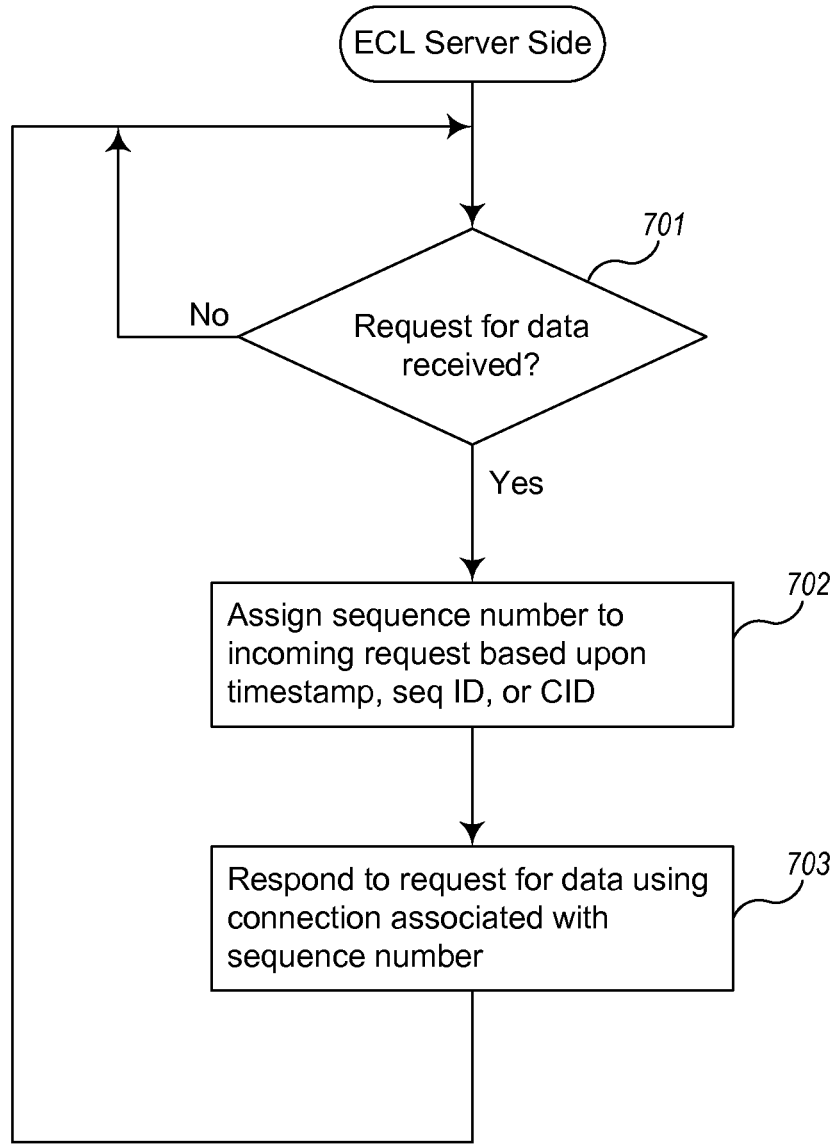
FIG. 7 is an example flow diagram of server side Enhanced Communication Layer logic according to example embodiments.

In other embodiments, blocks 604 and 605 are modified to start up the second (or more) connections after (instead of before) the logic sends the first data request of the first connection. Other alternatives, such as the second connection occurring sometimes before and sometimes after, are possible. Thus, it is possible to spawn different behaviors depending upon a use of threaded, parallel, asynchronous, or synchronous communication. The server logic, as described with respect to FIG. 7, is used to make sure that the sequence order of the requests to responses is preserved.

In block 606, the logic determines whether multi-part payloads are supported by the protocol with multi-part requests (client side), and, if so, keeps the first connection open, otherwise closes the first connection. The logic then continues to block 601 to wait for the next event.

In block 607, the logic determines whether it has received a second (or subsequent) data request to send data to the server. If so, it continues to block 608, otherwise returns to block 601 to wait for the next event.

In block 608, the logic determines whether the first data request to send data to the server has completed (the blocking has ended and/or the logic has received a callback). If multi-part requests are supported (then the first connection is still open), then the logic proceeds to block 609, other proceeds to block 610.

In block 609, the logic uses the open first connection to send the send data request to send data to the server, and proceeds to block 604 to determine whether to start another connection.

In block 610, the logic determines whether the first data request to send data has not completed or whether the first connection has been closed. If so (either case), the logic proceeds to block 611 to use the second (or next subsequent) data connection as soon as it finishes its setup, and proceeds to block 604 to determine whether to start another connection. Otherwise, the logic proceeds back to block 608 to wait for the first data request to send data to complete.

Of note, some browsers support a maximum number of connections to the same server. This may affect the number of connections that are used to implement the pseudo permanent connection. In addition, in some embodiments, the client side ECL may determine or be notified that that requests may be delivered out of sequence (and still be handled properly by the server side ECL). Thus, more parallel connections between the client and server may be used to provide greater bandwidth. In some embodiments, two, four, or even a greater number of connections may be employed to provide a pseudo permanent connection. In yet other embodiments requests and/or responses may be delivered and/or responded to out of sequence and the logic tasked with keeping track of any sequencing.

FIG. 7 is an example flow diagram of server side Enhanced Communication Layer logic according to example embodiments. The server side ECL logic may be provided, for example, by ECL 201 in FIG. 2. In block 701, the logic determines whether a request for data has been received. If so, the logic continues in block 702, otherwise returns to block 701 to wait for the next event. In block 702, the logic assigns a sequence number to the incoming request. This sequence number may be based upon a timestamp, sequence identifier, or a connection identifier (or other identifier) assigned client side and passed in a communications packet. These identifiers are used to insure that data requests are processed in the order received.

In block 702 the logic responds to a request for data (e.g., using HTTP response and by obtaining the requested data in order to forward it to the client) using the connection associated with that sequence number. Other processing is performed using known TCP/IP style of communications.

Also, although not shown in FIG. 6A-6B or 7, the ECL may perform other processing such as automatically handling data compression and encryption in a manner that is transparent to the client and/or server. Also, at any time a connection may time out, or fail. The ECL automatically makes new connections and retries, without requiring the client application or server logic to intercept (it is handled inside of the ECL). Notification of such may be provided to the endpoints (the client application or server logic) for example, for logging purposes. These notifications may be ignored or suppressed.

The size of the pool of connections as used by the logic of FIGS. 6A-6B and 7 may vary in different embodiments. In addition, different algorithms may be employed to minimize the resulting latency as related to the rate of data that is sent.

All of the above U.S. patents, U.S. patent application publications, U.S. patent applications, foreign patents, foreign patent applications and non-patent publications referred to in this specification and/or listed in the Application Data Sheet, including but not limited to 61/528,634, entitled "PERMANENT CONNECTION ORIENTED COMMUNICATION USING PARALLEL SINGLE CONNECTION CIRCUITS," filed on Aug. 29, 2011, which is incorporated herein by reference in its entirety.

From the foregoing it will be appreciated that, although specific embodiments have been described herein for purposes of illustration, various modifications may be made without deviating from the spirit and scope of the invention. For example, the methods, systems, and techniques for presenting dynamically changing images discussed herein are applicable to architectures or environments other than a Web-based environment. Also, the methods, systems, and techniques discussed herein are applicable to differing protocols, communication media (optical, wireless, cable, etc.) and devices (such as wireless handsets, electronic organizers, personal digital assistants, tablet computers, smart phones, portable email machines, game machines, pagers, navigation devices such as GPS receivers, etc.)

The invention claimed is:

1. A method in a client computing system for providing a pseudo permanent communications connection using communications connections that close when a response corresponding to a request is received, comprising:
   receiving a first request to send data to a server;
   opening a first communications data connection to the server in response to the first request, the communications data connection of a type that will close when a response is received;
   transmitting the first request to send data over the opened first communications data connection;
   opening a second communications data connection to the same server before the first request to send data is completed, the second communications data connection of a type that will close when a response is received that corresponds to a request transmitted over the second communications data connection;
   determining whether parallel threading is available in the client computing system; and
   in response to the determination, performing the steps of:
      receiving a second request to send data to the server; and
      transmitting the second request to send data over the second communications data connection after the data associated with the first request has been completely received,
   wherein the first communications data connection and the second communications data connection are a part of a pool of connections.

2. The method of claim 1 wherein the first and second communications connections are provided using an HTTP protocol.

3. The method of claim 1 wherein the opening of the second communications data connection to the same server is performed before the first request to send data is transmitted over the opened first communications data connection.

4. The method of claim 1, further comprising:
   opening a third communications data connection to the same server before the second request to send data is completed, the third communications data connection of a type that will close when a response is received that corresponds to a request transmitted over the third communications data connection.

5. The method of claim 4 wherein the opening of the third communications data connection to the same server is performed before the second request to send data is transmitted over the opened second communications data connection.

6. The method of claim 1, further comprising:
   opening a third communications data connection to the same server before the first request to send data is completed, the third communications data connection of a type that will close when a response is received that corresponds to a request transmitted over the third communications data connection.

7. The method of claim 6 wherein the opening of the third communications data connection to the same server is performed before the first request to send data is transmitted over the opened first communications data connection.

8. A non-transitory computer-readable medium having contents that, when executed, enable a computing device to provide a pseudo permanent communication connection by performing a method comprising:
 receiving a first request to send data to a server;
 opening a first communications data connection to the server in response to the first request, the communications data connection of a type that will close when a response is received;
 transmitting the first request to send data over the opened first communications data connection and opening a second communications data connection to the same server before the first request to send data is completed, the second communications data connection of a type that will close when a response is received that corresponds to a request transmitted over the second communications data connection;
 determining whether parallel threading is available in the client computing system; and
 in response to the determination, performing the steps of:
  receiving a second request to send data to the server; and
  transmitting the second request to send data over the second communications data connection after the data associated with the first request has been completely received,
 wherein the first communications data connection and the second communications data connection are a part of a pool of connections.

9. The non-transitory computer-readable medium of claim 8 wherein the first and second communications connections are provided using an HTTP protocol.

10. The non-transitory computer-readable medium of claim 8 wherein the opening of the second communications data connection to the same server is performed before the first request to send data is transmitted over the opened first communications data connection.

11. The non-transitory computer-readable medium of claim 8, the method further comprising:
 opening a third communications data connection to the same server before the second request to send data is completed, the third communications data connection of a type that will close when a response is received that corresponds to a request transmitted over the third communications data connection.

12. The non-transitory computer-readable medium of claim 8 wherein the computer-readable medium is a memory in the computing device.

13. The non-transitory computer-readable medium of claim 8 wherein the contents are instructions that when executed cause the computing device to perform the method.

14. A computing system comprising:
 a memory;
 a module stored on the memory that is configured, when executed, to:
  receive a first request to send data to a server;
  open a first communications data connection to the server in response to the first request, the communications data connection of a type that will close when a response is received;
  transmit the first request to send data over the opened first communications data connection and opening a second communications data connection to the same server before the first request to send data is completed, the second communications data connection of a type that will close when a response is received that corresponds to a request transmitted over the second communications data connection;
  determine whether parallel threading is available in the client computing system; and
  in response to the determination, performing the steps of:
   receive a second request to send data to the server; and
   transmit the second request to send data over the second communications data connection after the data associated with the first request has been completely received,
  wherein the first communications data connection and the second communications data connection are a part of a pool of connections.

15. The computing system of claim 14 wherein the first and second communications connections are provided using an HTTP protocol.

16. The computing system of claim 14 wherein the module opens the second communications data connection to the same server before the first request to send data is transmitted over the opened first communications data connection.

17. The computing system of claim 14 wherein the module is further configured, when executed, to:
 open a third communications data connection to the same server before the second request to send data is completed, the third communications data connection of a type that will close when a response is received that corresponds to a request transmitted over the third communications data connection.

18. The computing system of claim 14 wherein the module includes software instructions for execution in the memory of the computing system.

19. The computing system of claim 14 wherein the computing system is a client computing device and the module is a communications layer.

20. The computing system of claim 14 wherein the computing system further comprises:
 a client computing device that includes the memory;
 a server computing system that receives requests for data from the client computing system.

* * * * *